United States Patent
Davidovici et al.

[11] Patent Number: 6,130,906
[45] Date of Patent: Oct. 10, 2000

[54] PARALLEL CODE MATCHED FILTER

[75] Inventors: Sorin Davidovici, Oceanpoint; Emmanuel Kanterakis, North Brunswick, both of N.J.; Michael Hennedy, Staten Island, N.Y.; Kenneth J. Keyes, Tinton Falls; Jimmy Cuong Tran, Jackson, both of N.J.

[73] Assignee: Golden Bridge Technology, Inc., West Long Branch, N.J.

[21] Appl. No.: 09/083,193

[22] Filed: May 22, 1998

[51] Int. Cl.[7] .................................................. H04B 1/707
[52] U.S. Cl. ............................................................ 375/152
[58] Field of Search ................................. 375/130, 143, 375/152, 343; 708/314, 316

[56] References Cited

U.S. PATENT DOCUMENTS

| | | | |
|---|---|---|---|
| 4,320,531 | 3/1982 | Dimon | 455/203 |
| 4,507,746 | 3/1985 | Fletcher, Jr. | 364/717 |
| 4,903,225 | 2/1990 | Brost | 364/728.03 |
| 5,081,643 | 1/1992 | Schilling | 375/1 |
| 5,109,390 | 4/1992 | Gilhousen et al. | 375/1 |
| 5,448,507 | 9/1995 | Strawn | 364/728.06 |
| 5,715,276 | 2/1998 | Tran et al. | 375/207 |
| 5,999,562 | 12/1999 | Hennedy et al. | 375/207 |
| 6,005,903 | 12/1999 | Mendelovicz | 375/367 |
| 6,061,359 | 5/2000 | Schilling et al. | 370/441 |

*Primary Examiner*—Don N. Vo
*Attorney, Agent, or Firm*—David Newman Chartered

[57] ABSTRACT

A spread-spectrum receiver for time sharing a correlator for simultaneously receiving a plurality of parallel spread-spectrum signals. A combined multiplicity of symbols includes a multiplicity of symbols, simultaneously occurring during a symbol-time duration, from a plurality of spread-spectrum signals. A demultiplexer demultiplexes a sequence of the combined multiplicity of symbols into a plurality of symbol registers. Each of the symbol registers stores the chip-sequence signals corresponding to the combined multiplicity of symbols which were sent to the particular symbol register. A multiplexer selects a symbol register, other than the symbol register selected by the demultiplexer. The multiplicity of chip-sequence signals stored in the selected symbol register by the multiplexer are compared by a comparator with a multiplicity of replicas of the chip-sequence signals used to generate the spread-spectrum signals.

7 Claims, 1 Drawing Sheet

PARALLEL CODE MATCHED FILTER

BACKGROUND OF THE INVENTION

This invention relates to spread-spectrum communications, and more particularly to an efficient matched filter for detecting a plurality of chip-sequence signals embedded in a plurality of spread-spectrum signals arriving in parallel and simultaneously at a receiver.

DESCRIPTION OF THE RELEVANT ART

One approach to receiving a multiplicity of spread-spectrum signals is to have a receiver with a multiplicity of correlators or matched filters, with each of the correlation or impulse functions of the multiplicity of correlators or matched filters matched to a respective chip-sequence signal embedded in each of the spread-spectrum signals of the multiplicity of spread-spectrum signals. A problem with this approach is the cost of having multiple correlators or matched filters. This cost increases further if early, punctual and late correlators or matched filters were also required.

Consider a spread-spectrum system having a chip-time duration of 100 nanoseconds and a symbol-time duration of two microseconds. Assume 16 spread-spectrum signals with these characteristics are transmitted together, i.e., in parallel.

When receiving these signals, assume they are sampled at ½ the chip rate. This means that, for a single spread-spectrum signal, a new sample is put into the matched filter every 50 nanoseconds. The matched filter has a valid output, i.e., a peak-correlation signal, when the chips of the sequence of the spread-spectrum signal line up with the reference or impulse response of the matched filter. The peak-correlation signal is lost 50 nanoseconds later.

Assume that 20 parallel spread-spectrum signals are to be received. This means that during 50 nanoseconds, the 20 chip-sequence signals embedded in the 20 parallel spread-spectrum signals are correlated during 50 nanoseconds, or one correlation ever 2.5 nanoseconds. Using present technology, such a requirement is very difficult to achieve.

SUMMARY OF THE INVENTION

A general object of the invention is to detect a multiplicity of chip-sequence signals embedded in a multiplicity of spread-spectrum signals arriving at a receiver.

According to the present invention, as embodied and broadly described herein, a parallel-code-matched filter is provided. The parallel-code-matched-filter detects, during a symbol-time duration, each symbol of a combined multiplicity of symbols from the plurality of linearly combined, spread-spectrum signals, arriving in parallel at the parallel-code-matched filter.

A combined-spread-spectrum signal is defined to have a plurality of linearly combined, spread-spectrum signals. Each spread-spectrum signal includes a plurality of symbols, with each symbol occurring sequentially in time, and with one symbol occurring during a symbol-time duration. The combined multiplicity of symbols is received during the symbol-time duration, with each symbol of the combined multiplicity of symbols from a respective spread-spectrum signal of the plurality of spread-spectrum signals. Within each symbol-time duration, for a particular spread-spectrum signal, is a chip-sequence signal different from a multiplicity of chip-sequence signals used by symbols embedded in other spread-spectrum signals of the plurality of spread-spectrum signals.

The parallel-code-matched filter includes a demultiplexer, a plurality of symbol registers, a first multiplexer, a reference register, a reference multiplexer, an EXCLUSIVE-OR (XOR) bank, and an adder tree. The parallel-code-matched filter optionally may include a shift-left register, a shift-right register and a second multiplexer.

The demultiplexer demultiplexes, sequentially, a sequence of the combined multiplicity of symbols. Each symbol-shift register is sequentially selected by the demultiplexer. Each of the plurality of symbol registers stores a combined multiplicity of chip-sequence signals, which occurred during the symbol-time duration, corresponding to the combined multiplicity of symbols, occurring during the symbol-time duration, of the plurality of spread-spectrum signals.

The first multiplexer selects a shift register from the plurality of shift registers. The selected-shift register is not simultaneously selected by the demultiplexer.

The reference register stores a plurality of replicas of the chip-sequence signals embedded in the plurality of linearly-combined spread-spectrum signals, respectively. The reference multiplexer sequentially selects, during the symbol-time duration, each of the plurality of replicas of the chip-sequence signals.

The XOR bank compares the combined multiplicity of chip-sequence signals stored in the selected-shift register, with each of the plurality of replicas of the chip-sequence signals as sequentially selected by the reference multiplexer, and generates a plurality of outputs. The adder tree adds the plurality of outputs from the XOR bank to generate an output signal.

Additional objects and advantages of the invention are set forth in part in the description which follows, and in part are obvious from the description, or may be learned by practice of the invention. The objects and advantages of the invention also may be realized and attained by means of the instrumentalities and combinations particularly pointed out in the appended claims.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DETAILED DESCRIPTION OF THE PREFERRED EMBODIMENTS

Figure 1:
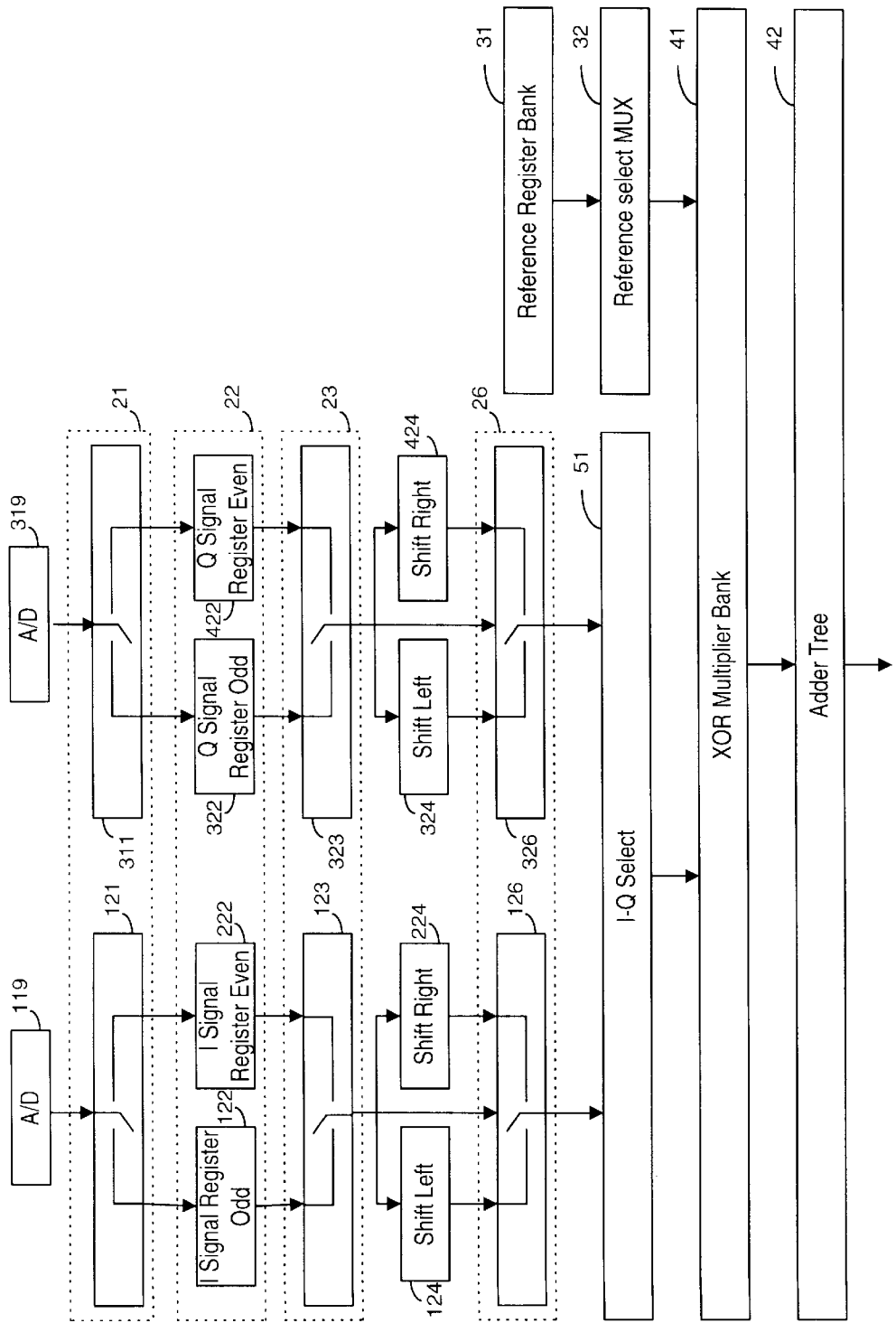
FIG. 1 is a block diagram of a parallel-code matched filter.

Reference now is made in detail to the present preferred embodiments of the invention, an example of which is illustrated in the accompanying drawing.

The present invention provides a novel apparatus and method for detecting a plurality of chip-sequence signals embedded in a plurality of spread-spectrum signals arriving in parallel at a spread-spectrum receiver.

A plurality of spread-spectrum signals are defined herein to arrive in parallel when the plurality of spread-spectrum signals arrive simultaneously in time at a spread-spectrum receiver. Preferably, each of the plurality of chip-sequence signals is synchronized in time, and thus each sequences of chips starts at the same point in time as the other sequences of chips in each of the plurality of spread-spectrum signals, when referenced at the spread-spectrum receiver.

A combined-spread-spectrum signal is defined to have a plurality of linearly-combined, spread-spectrum signals. Each spread-spectrum signal includes a plurality of symbols. Each symbol has a symbol-time duration, and a chip-sequence signal different from a multiplicity of chip-sequence signals used by symbols embedded in other spread-spectrum signals of the plurality of spread-spectrum signals.

During a symbol-time duration, a combined multiplicity of symbols are present at the input to the receiver. Each symbol in the combined multiplicity of symbols is from one of the spread-spectrum signals of the plurality of linearly-combined, spread-spectrum signals. By correlating each chip-sequence signal of the combined multiplicity of symbols, the parallel-code-matched filter detects, during the symbol-time duration, each symbol of the combined multiplicity of symbols from the plurality of linearly-combined spread-spectrum signals, arriving in parallel at the parallel-code-matched filter.

The parallel-code-matched filter includes demultiplexer means, symbol-register means, first multiplexer means, reference means and comparator means. Optionally, the parallel-code-matched filter may include shift-left means, shift-right means and second multiplexer means.

The demultiplexer means demultiplexes, sequentially, a sequence of the combined multiplicity of symbols. The symbol-register means includes a plurality of registers, with each register capable of storing the combined multiplicity of symbols occurring during a particular symbol-time duration. During the particular, for example a first, symbol-time duration, the combined multiplicity of symbols present are stored in a first register of the symbol-register means. Each symbol register of the symbol-register means sequentially is selected by the demultiplexer means. During a second symbol time duration, a second combined multiplicity of symbols is stored in a second symbol register.

The starting point in time for each sequence of the combined multiplicity of symbols may be known from a header, which provides timing for each spread-spectrum signal. This timing can be used for controlling the demultiplexer and directing chip-sequence signals into one of the registers of the symbol-register means.

Each symbol register of the symbol-register means stores a combined multiplicity of chip-sequence signals, occurring during the symbol-time duration, corresponding to the combined multiplicity of symbols, occurring during the symbol-time duration, of the plurality of linearly-combined spread-spectrum signals. Each chip-sequence signal is assumed to have a length in time, before repeating, of a symbol-time duration.

The first multiplexer means is coupled to the symbol registers means. The first multiplexer means selects a register from the symbol-register means, with the selected register not simultaneously selected by the demultiplexer means. Thus, by way of example, if the symbol-register means included two symbol registers, a first symbol register and a second symbol register, and if the demultiplexer means were directing a first multiplicity of symbols into the first symbol register, then the multiplexer means would select the second symbol register and, as a consequence, a second multiplicity of symbols would be stored in the second symbol register.

The reference means stores a plurality of replicas of the chip-sequence signals embedded in the plurality of linearly-combined spread-spectrum signals. The reference means sequentially selects, during the symbol-time duration, each of the plurality of replicas of the chip-sequence signals.

The comparator means compares the combined multiplicity of chip-sequence signals stored in the selected register, as selected by the first multiplexer means, with each of the plurality of replicas of the chip-sequence signals as sequentially selected by the reference means. The comparator means may include an adder tree which generates an output signal for each detection of one of the chip-sequence signals in the combined multiplicity of chip-sequence signals, present in the selected symbol register.

The parallel-code-matched filter may detect early and late arriving spread-spectrum signals using shift-left means and shift-right means. Shift-left means is coupled to the first multiplexer means. Shift-left means shifts to the left the multiplicity of chip-sequence signals stored in the selected-shift register. Shift-right means is also coupled to the first multiplexer means. Shift-right means shifts to the right the combined multiplicity of symbols stored in the selected-shift register.

The second multiplexer means is coupled to the first multiplexer means, to the shift-left means and to the shift-right means. Present at the output of the first multiplexer means is the combined multiplicity of chip-sequence signals stored in the symbol register selected by the first multiplexer means. The second multiplexer means selects sequentially one of the selected-shift register, the shift-right means and the shift-left means. The comparator means compares the combined multiplicity of chip-sequence signals stored in the selected-shift register, the shift-left means, or shift-right means with each of the plurality of replicas of the chip-sequence signals as sequentially selected by the first multiplexer means, and generates an output signal.

In the exemplary arrangement shown in FIG. 1, the parallel-code-matched filter is embodied with the demultiplexer means including a demultiplexer 21. The demultiplexer 21 demultiplexes, sequentially, a sequence of the combined multiplicity of symbols, occurring during the symbol-time duration. The demultiplexer 21 is coupled to timing circuits, which have their timing referenced to one or more of the spread-spectrum signals of the plurality of spread-spectrum signals. The timing reference may come from a pilot spread-spectrum channel, from a header on one or more of the spread-spectrum signals, or from other techniques known in the art.

The demultiplexer 21 may include an in-phase demultiplexer 121 and a quadrature-phase demultiplexer 321, for demultiplexing an in-phase component and a quadrature-phase component of the sequence of the combined multiplicity of symbols, respectively. The in-phase component and the quadrature-phase component are from in-phase and quadrature-phase processing of the received spread-spectrum signal, which technology is well known in the art. The in-phase component and the quadrature-phase component are converted to digital form by an in-phase analog-to-digital converter 119 and a quadrature-phase analog-to-digital converter 319, respectively.

The symbol-register means may be embodied as a plurality of symbol registers 22. The plurality of symbol registers 22 is coupled to the demultiplexer 21. Each symbol register 22 is sequentially selected by the demultiplexer 21 for storing a combined multiplicity of chip-sequence signals. A combined multiplicity of chip-sequence signals occurs during the symbol-time duration, corresponding to the combined multiplicity of symbols of the plurality of spread-spectrum signals.

The symbol-register means may include a plurality of in-phase symbol registers and a plurality of quadrature-phase symbol registers. FIG. 1, shows, by way of example, where the plurality of in-phase symbol registers includes a first in-phase symbol register 122 and a second in-phase symbol register 222, and a first quadrature-phase symbol register 322 and a second quadrature-phase symbol register 422. The in-phase demultiplexer 121 alternates in selecting, during alternate symbol-time durations, the first in-phase symbol register 122 and the second in-phase symbol register 222. Similarly, the quadrature-phase demultiplexer 321 alternates in selecting, during alternate symbol-time durations, the first quadrature-phase symbol register 322 and the second quadrature-phase symbol register 422.

The first multiplexer means may be embodied as multiplexer 23. The first multiplexer 23 is coupled to the plurality of symbol registers 22. The first multiplexer 23 selects a symbol register from the plurality of symbol registers 22. The selected register is not simultaneously selected by the demultiplexer 21.

The first multiplexer means may include a first in-phase multiplexer 123 and a first quadrature-phase multiplexer 323. FIG. 1 illustrates the first in-phase multiplexer 123 selecting between the first in-phase symbol register 122 and the second in-phase symbol-register 222. The symbol register selected by the first in-phase multiplexer 123 is not simultaneously selected by the in-phase demultiplexer 121. Thus, if the first in-phase multiplexer 123 selected the first in-phase symbol register 122, then the in-phase demultiplexer 121 would select an in-phase symbol register other than the first in-phase symbol register 122. For the case of two in-phase symbol registers, the in-phase demultiplexer 121 would select the second in-phase symbol register 222. If more than two symbol registers were used for the in-phase component, then the in-phase demultiplexer 121 would select from the available symbol registers.

Similar to the in-phase symbol register, the first quadrature-phase multiplexer 323 selects between the first quadrature-phase symbol register 322 and the second quadrature-phase symbol register 422. The symbol register selected by the first quadrature-phase multiplexer 323 is not simultaneously selected by the quadrature-phase demultiplexer 321. Thus, if the first quadrature-phase multiplexer 323 selected the first quadrature-phase symbol register 322, then the quadrature-phase demultiplexer 321 would select a quadrature-phase symbol register other than the first quadrature-phase symbol register 322.

The shift-left means may be embodied as an in-phase shift-left register 124 and a quadrature-phase shift-left register 324. The shift-right means may be embodied as in-phase shift-right register 224 and quadrature-phase shift-right register 424. The second multiplexer means may be embodied as a second multiplexer 26, which can include a second in-phase multiplexer 126 and a second quadrature-phase multiplexer 326. The shift left and shift right functions of these registers correspond to detecting early and late arrival of spread-spectrum signals in the plurality of spread-spectrum signals.

The in-phase shift-left register 124 is coupled to the first in-phase multiplexer 123. The in-phase shift-left register 124 shifts left the multiplicity of chip-sequence signals stored in the register selected by the first in-phase multiplexer 123. The in-phase shift-right register 224 is coupled to the first in-phase multiplexer 123. The in-phase shift-right register 224 shifts right the multiplicity of symbols stored in the symbol register selected by the first in-phase multiplexer 123.

The second in-phase multiplexer 126 is coupled to the first in-phase multiplexer 123, to the in-phase shift-left register 124 and to the in-phase shift-right register 224. The second in-phase multiplexer 126 selects sequentially one of the first multiplexer 123, the in-phase shift-right register 224 and the in-phase shift-left register 124.

The quadrature-phase shift-left register 324 is coupled to the first quadrature-phase multiplexer 323. The quadrature-phase shift-left register 324 shifts left the multiplicity of chip-sequence signals stored in the register selected by the first quadrature-phase multiplexer 323. The quadrature-phase shift-right register 424 is coupled to the first quadrature-phase multiplexer 323. The quadrature-phase shift-right register 424 shifts right the plurality of symbols stored in the symbol register selected by the quadrature-phase multiplexer 323.

The second quadrature-phase multiplexer 326 is coupled to the first quadrature-phase multiplexer 323, to the quadrature-phase shift-left register 324 and to the quadrature-phase shift-right register 424. The second quadrature-phase multiplexer 326 selects sequentially one of the first quadrature-phase multiplexer 323, the quadrature-phase shift-right register 424 and the quadrature-phase shift-left register 324.

The in-phase/quadrature-phase multiplexer 51 selects one of the second in-phase multiplexer 126 and the second quadrature-phase multiplexer 326, for alternating processing in-phase and quadrature-phase.

The reference means may be embodied as a reference register 31 and a reference multiplexer 32. The reference multiplexer 32 is coupled to the reference register 31. The reference register 31 stores a plurality of replicas of the chip-sequence signals embedded in the plurality of linearly-combined spread-spectrum signals. The reference multiplexer 32 sequentially selects, during the symbol-time duration, each of the plurality of replicas of the chip-sequence signals.

The correlator means may be embodied as an EXCLUSIVE-OR (XOR) bank 41. The XOR bank 41 is coupled to the in-phase/quadrature-phase (I-Q) multiplexer 51 and to the reference multiplexer 32. The XOR bank 41 compares the combined multiplicity of chip-sequence signals stored in one of the selected registers, as selected by the second in-phase multiplexer 126, the second quadrature-phase multiplexer 326, and by the I-Q multiplexer 51. Each of the plurality of replicas of the chip-sequence signals is sequentially selected by the reference multiplexer 32, and compared with the combined multiplicity of chip-sequence signals stored in a selected register.

The correlator means may include an adder tree 42. The adder tree 42 is coupled to the XOR bank 41. The adder tree 42 adds a plurality of outputs from the XOR bank 41 and, upon detecting a correlation, generates an output correlation signal.

The present invention also includes a method, using a parallel-code-matched filter. A combined-spread-spectrum signal has a plurality of linearly-combined, spread-spectrum signals. Each spread-spectrum signal includes a plurality of symbols. Each symbol has a symbol-time duration, and a chip-sequence signal different from a multiplicity of chip-sequence signals used by symbols embedded in other spread-spectrum signals of the plurality of spread-spectrum signals. The method detects, during the symbol-time duration, a combined multiplicity of symbols from the plurality of linearly-combined, spread-spectrum signals, arriving in parallel at the parallel-code-matched filter.

The method comprises the steps of demultiplexing, sequentially, a sequence of the combined multiplicity of symbols, occurring during the symbol-time duration, and a storing sequentially a combined multiplicity of chip-sequence signals, occurring during the symbol-time duration, corresponding to the combined multiplicity of symbols of the plurality of spread-spectrum signals. The method further includes the steps of selecting a shift register from a plurality of symbol registers, with the selected-shift register not simultaneously selected by the demultiplexing step, and storing a plurality of replicas of the chip-sequence signals embedded in the plurality of linearly-combined spread-spectrum signals. Sequentially, during the symbol time duration, each of the plurality of replicas of the chip-sequence signals are selected. The combined multiplicity of chip-sequence signals stored in the selected-shift register are compared with each of the plurality of replicas of the chip-sequence signals as sequentially selected.

The method may further include the steps of shifting right the plurality of symbols stored in the selected-shift register and selecting sequentially one of the selected-shift register, the shift-right register and the shift-left register.

It will be apparent to those skilled in the art that various modifications can be made to the parallel code matched filter of the instant invention without departing from the scope or spirit of the invention, and it is intended that the present invention cover modifications and variations of the parallel code matched filter provided they come within the scope of the appended claims and their equivalents.

We claim:

1. A parallel-code-matched filter, responsive to a combined-spread-spectrum signal having a plurality of linearly combined spread-spectrum signals, with each spread-spectrum signal including a plurality of symbols, with each symbol having a symbol-time duration, with each symbol having a chip-sequence signal different from a multiplicity of chip-sequence signals used by symbols embedded in other spread-spectrum signals of the plurality of linearly-combined spread-spectrum signals, said parallel-code-matched filter for detecting, during the symbol-time duration, a combined multiplicity of symbols from the plurality of linearly combined spread-spectrum signals arriving in parallel at the parallel-code-matched filter, comprising:

a demultiplexer for demultiplexing, sequentially, a sequence of the combined multiplicity of symbols, occurring during the symbol-time duration;

a plurality of symbol registers, coupled to said demultiplexer, with each symbol register sequentially selected by said demultiplexer, for storing a combined multiplicity of chip-sequence signals, occurring during the symbol-time duration, corresponding to the combined multiplicity of symbols, occurring during the symbol-time duration, of the plurality of linearly-combined spread-spectrum signals;

a first multiplexer, coupled to said plurality of symbol registers, for selecting a selected-shift register from the plurality of symbol registers, with the selected-shift register not simultaneously selected by said demultiplexer;

a shift-left register, coupled to said first multiplexer, for shifting left the combined multiplicity of chip-sequence signals stored in said selected-shift register;

a shift-right register, coupled to said first multiplexer, for shifting right the combined multiplicity of symbols stored in said selected-shift register;

a second multiplexer, coupled to said first multiplexer, to said shift-left register and to said shift-right register, for selecting sequentially one of the selected-shift register, the shift-right register and the shift-left register;

a reference register for storing a plurality of replicas of the chip-sequence signals embedded in the plurality of linearly-combined spread-spectrum signals;

a reference multiplexer, coupled to said reference register, for sequentially selecting, during the symbol-time duration, each of the plurality of replicas of the chip-sequence signals;

an EXCLUSIVE-OR (XOR) bank, coupled to said second multiplexer and to said reference multiplexer, for comparing the combined multiplicity of chip-sequence signals stored in one of said selected-shift register, said shift-left register and said shift-right register, as selected by said second multiplexer, with each of the plurality of replicas of the chip-sequence signals as sequentially selected by said reference multiplexer, and for generating a plurality of outputs; and an adder tree, coupled to said XOR bank, for adding the plurality of outputs from said XOR bank, thereby generating an output signal.

2. A parallel-code-matched filter, responsive to a combined-spread-spectrum signal having a plurality of linearly combined spread-spectrum signals, with each spread-spectrum signal including a plurality of symbols, with each symbol having a symbol-time duration, with each symbol having a chip-sequence signal different from a multiplicity of chip-sequence signals used by symbols embedded in other spread-spectrum signals of the plurality of linearly-combined spread-spectrum signals, said parallel-code-matched filter for detecting, during the symbol-time duration, a combined multiplicity of symbols from the plurality of linearly combined spread-spectrum signals arriving in parallel at the parallel-code-matched filter, comprising:

demultiplexer means for demultiplexing, sequentially, a sequence of the combined multiplicity of symbols, occurring during the symbol-time duration;

symbol-register means for storing a combined multiplicity of chip-sequence signals, occurring during the symbol-time duration, corresponding to the combined multiplicity of symbols, occurring during the symbol-time duration, of the plurality of linearly-combined spread-spectrum signals, with each symbol register sequentially selected by said demultiplexer means;

first multiplexer means, coupled to said symbol-register means, for selecting a selected-shift register from said symbol-register means, with the selected-shift register not simultaneously selected by said demultiplexer means;

means for storing a plurality of replicas of the chip-sequence signals embedded in the plurality of linearly-combined spread-spectrum signals, and for sequentially selecting, during the symbol-time duration, each of the plurality of replicas of the chip-sequence signals; and comparator means for comparing the combined multiplicity of chip-sequence signals stored in said selected-shift register, as selected by said first multiplexer means, with each of the plurality of replicas of the chip-sequence signals as sequentially selected by said reference means, and for generating an output signal.

3. The parallel-code-matched filter as set forth in claim 2 further including:

a shift-left register, coupled to said first multiplexer means, for shifting left the combined multiplicity of chip-sequence signals stored in said selected-shift register;

a shift-right register, coupled to said first multiplexer means, for shifting right the combined multiplicity of symbols stored in said selected-shift register; and second multiplexer means, coupled to said first multiplexer means, to said shift-left register and to said shift-right register, for selecting sequentially one of the selected-shift register, the shift-right register and the shift-left register.

4. The parallel-code-matched filter as set forth in claim 3, with said reference means including:

a reference register for storing the plurality of replicas of the chip-sequence signals embedded in the plurality of linearly-combined spread-spectrum signals; and a reference multiplexer for sequentially selecting, during the symbol-time duration, each of the plurality of replicas of the chip-sequence signals.

5. The parallel-code-matched filter as set forth in claim 4, with said comparator means including:

an EXCLUSIVE-OR (XOR) bank coupled to said second multiplexer means and to said reference multiplexer, for comparing the combined multiplicity of chip-sequence signals stored in one of said selected-shift register, said shift-left register and said shift-right register, as selected by said second multiplexer means, with each of the plurality of replicas of the chip-sequence signals as sequentially selected by said reference multiplexer, and for generating a plurality of outputs; and an adder tree, coupled to said XOR bank, for adding the plurality of outputs from said XOR bank, thereby generating an output signal.

6. A method, using a parallel-code-matched filter, responsive to a combined-spread-spectrum signal having a plurality of linearly combined spread-spectrum signals, with each spread-spectrum signal including a plurality of symbols, with each symbol having a symbol-time duration, with each symbol having a chip-sequence signal different from a multiplicity of chip-sequence signals used by symbols embedded in other spread-spectrum signals of the plurality of linearly-combined spread-spectrum signals, said parallel-code-matched filter for detecting, during the symbol-time duration, a combined multiplicity of symbols from the plurality of linearly combined spread-spectrum signals arriving in parallel at the parallel-code-matched filter, comprising the steps of:

demultiplexing, sequentially, a sequence of the combined multiplicity of symbols, occurring during the symbol-time duration;

storing sequentially, using a plurality of symbol registers, a combined multiplicity of chip-sequence signals, occurring during the symbol-time duration, corresponding to the combined multiplicity of symbols, occurring during the symbol-time duration, of the plurality of linearly-combined spread-spectrum signals;

selecting a shift register from the plurality of symbol registers, with the selected-shift register not simultaneously selected by the demultiplexing step;

storing a plurality of replicas of the chip-sequence signals embedded in the plurality of linearly-combined spread-spectrum signals;

sequentially selecting, during the symbol-time duration, each of the plurality of replicas of the chip-sequence signals;

comparing the combined multiplicity of chip-sequence signals stored in the selected-shift register with each of the plurality of replicas of the chip-sequence signals as sequentially selected;

generating, from the comparisons, a plurality of outputs; and adding the plurality of outputs to generate an output signal.

7. The method as set forth in claim 6 further including the steps of:

shifting left the combined multiplicity of chip-sequence signals stored in said selected-shift register with a shift-left register;

shifting right the combined multiplicity of symbols stored in said selected-shift register with a shift-right register; and selecting sequentially one of the selected-shift register, the shift-right register and the shift-left register.

* * * * *